(12) United States Patent
Kikuchi

(10) Patent No.: US 11,775,236 B2
(45) Date of Patent: Oct. 3, 2023

(54) INFORMATION PROCESSING APPARATUS, PROCESSING METHOD OF INFORMATION PROCESSING APPARATUS, AND STORAGE MEDIUM

(71) Applicant: CANON KABUSHIKI KAISHA, Tokyo (JP)

(72) Inventor: Hiroshi Kikuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/322,302

(22) Filed: May 17, 2021

(65) Prior Publication Data
US 2021/0365222 A1 Nov. 25, 2021

(30) Foreign Application Priority Data
May 20, 2020 (JP) ................................. 2020-088055

(51) Int. Cl.
*G06F 3/12* (2006.01)
(52) U.S. Cl.
CPC .......... *G06F 3/1239* (2013.01); *G06F 3/1204* (2013.01); *G06F 3/1219* (2013.01); *G06F 3/1255* (2013.01); *G06F 3/1288* (2013.01)
(58) Field of Classification Search
CPC combination set(s) only.
See application file for complete search history.

(56) References Cited

U.S. PATENT DOCUMENTS

| | | | |
|---|---|---|---|
| 11,307,821 B2* | 4/2022 | Otsuka | G06F 3/126 |
| 2010/0079805 A1* | 4/2010 | Hashimoto | H04N 1/32502 |
| | | | 358/1.15 |
| 2019/0050184 A1* | 2/2019 | Ozawa | G06F 3/1222 |
| 2019/0114120 A1* | 4/2019 | Inoue | H04N 1/00938 |
| 2019/0289146 A1* | 9/2019 | Kobayashi | G06F 3/1204 |
| 2019/0356806 A1* | 11/2019 | Bhaskaran | H04L 67/306 |
| 2020/0159478 A1* | 5/2020 | Uemura | G06F 3/1254 |
| 2020/0285437 A1* | 9/2020 | Mori | G06F 3/1203 |
| 2020/0364006 A1* | 11/2020 | Otsuka | G06F 3/1285 |
| 2021/0240411 A1* | 8/2021 | Hayashi | G06F 3/1287 |

FOREIGN PATENT DOCUMENTS

JP  2016-157269 A  9/2016

* cited by examiner

*Primary Examiner* — Helen Zong
(74) *Attorney, Agent, or Firm* — Canon U.S.A., Inc. IP Division

(57) ABSTRACT

An information processing apparatus according to one aspect of the present disclosure includes a first acquisition unit that acquires a user print setting for a user, a change unit that changes the user print setting based on per-user print restriction information, and an edition unit that edits print data based on the changed user print setting.

9 Claims, 11 Drawing Sheets

INFORMATION PROCESSING APPARATUS, PROCESSING METHOD OF INFORMATION PROCESSING APPARATUS, AND STORAGE MEDIUM

BACKGROUND

Field

The present disclosure relates to an information processing apparatus, a processing method of the information processing apparatus, and a storage medium.

Description of the Related Art

In printing a document by using a printer, a technology to perform duplex printing or perform printing in an N in 1 setting in which reduction printing from a plurality of pages into a single physical sheet is performed for the purpose of saving paper resources is known. Moreover, when the technology is considered from the organization administrator's point of view, if the print setting can be forced on a user basis, a saving effect can be expected with a method that is more fit to the actual situation of the organization. Japanese Patent Application Laid-Open No. 2016-157269 discloses a technique to enforce a desired print setting by applying a prohibition to a print setting window for restricting a print setting on a user basis.

SUMMARY

An information processing apparatus according to embodiments of the present disclosure includes a first acquisition unit that acquires a user print setting for a user, a change unit that changes the user print setting based on per-user print restriction information, and an edition unit that edits print data based on the changed user print setting.

Further features of the present disclosure will become apparent from the following description of exemplary embodiments with reference to the attached drawings.

DESCRIPTION OF THE EMBODIMENTS

First Embodiment

Figure 1:
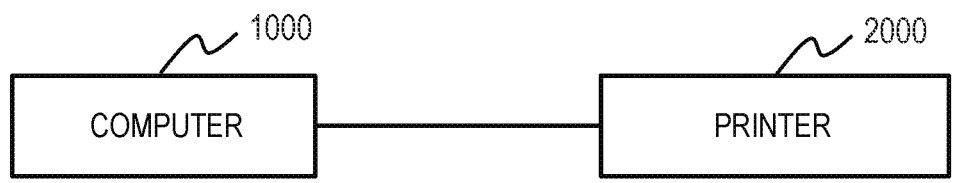
FIG. 1 is a diagram illustrating a configuration example of a printing system.

FIG. 1 is a diagram illustrating a configuration example of a printing system according to a first embodiment. The printing system has a computer 1000 and a printer 2000. The computer 1000 and the printer 2000 are connected to each other via a USB, a network, or the like and can communicate with each other. The computer 1000 is an information processing apparatus. The printer 2000 is an image forming apparatus.

Figure 2:
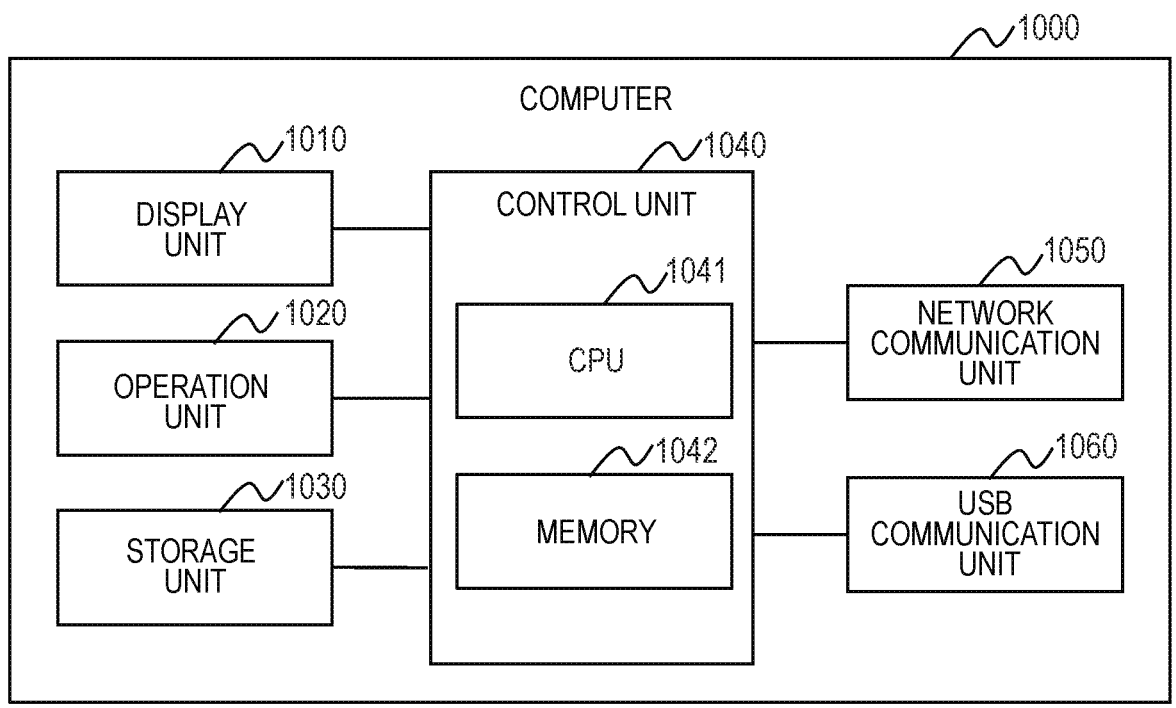
FIG. 2 is a diagram illustrating a hardware configuration example of a computer.

FIG. 2 is a block diagram illustrating a hardware configuration example of the computer 1000 of FIG. 1. The computer 1000 has a display unit 1010, an operation unit 1020, a storage unit 1030, a control unit 1040, a network communication unit 1050, and a USB communication unit 1060.

The control unit 1040 has a CPU 1041 and a memory 1042 and controls the overall computer 1000. The display unit 1010 is a display device such as a display. The operation unit 1020 is an input device such as a mouse or a keyboard. The storage unit 1030 is a storage medium such as a hard disk or an SSD and stores various programs (software) required when the computer 1000 operates. The CPU 1041 loads software stored in the storage unit 1030 into the memory 1042 if necessary and executes the program loaded into the memory 1042.

The network communication unit 1050 is connected to the network and inputs/outputs data to an external apparatus such as the printer 2000. The USB communication unit 1060 inputs/outputs data to an external apparatus such as the printer 2000 via a USB connection.

The CPU 1041 loads a program stored in the storage unit 1030 into the memory 1042, executes the program loaded into the memory 1042, and thereby implements a process of a computer. Note that a CPU is an abbreviation of a central processing unit.

Figure 3:
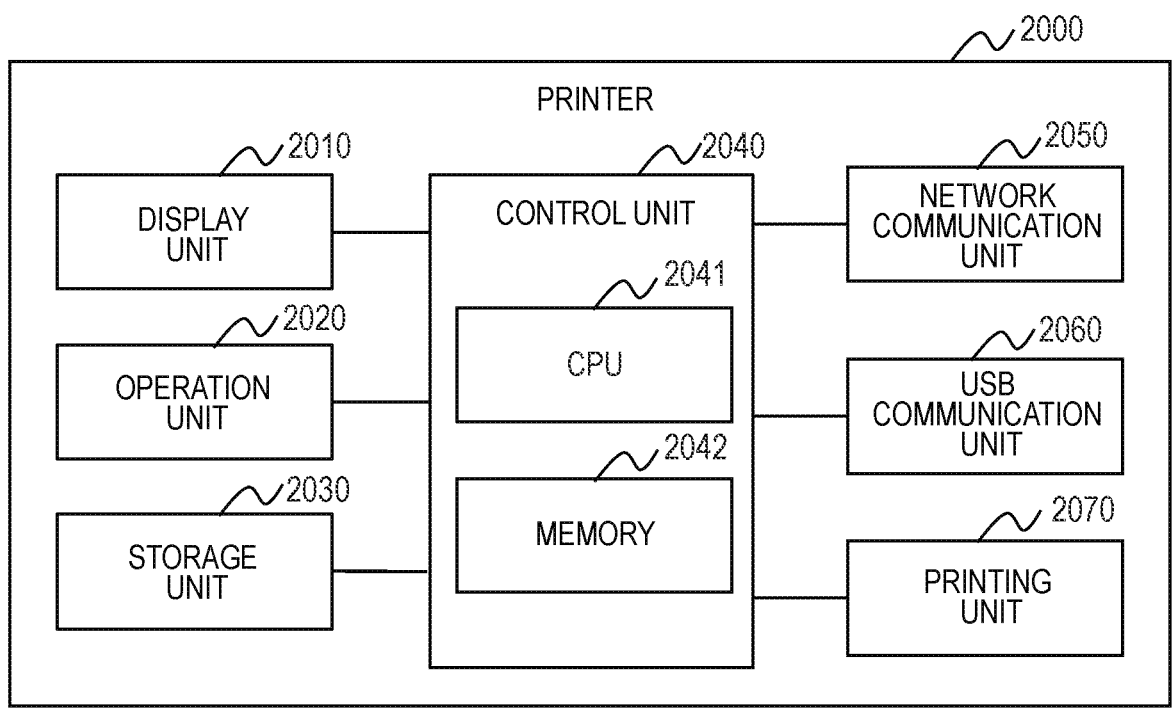
FIG. 3 is a diagram illustrating a hardware configuration example of a printer.

FIG. 3 is a block diagram illustrating a hardware configuration example of the printer 2000 of FIG. 1. The printer 2000 has a display unit 2010, an operation unit 2020, a storage unit 2030, a control unit 2040, a network communication unit 2050, a USB communication unit 2060, and a printing unit 2070.

The control unit 2040 has a CPU 2041 and a memory 2042 and controls the overall printer 2000. The display unit 2010 is a display device such as a liquid crystal panel. The operation unit 2020 is an input device with a touch panel or various buttons. The storage unit 2030 is a storage medium such as a hard disk or an SSD and stores various programs required when the printer 2000 operates. The CPU 2041 loads a program stored in the storage unit 2030 into the memory 2042 if necessary and executes the program loaded into the memory 2042.

The network communication unit 2050 is connected to the network and inputs/outputs data to the external apparatus such as the computer 1000. The USB communication unit 2060 inputs/outputs data to an external apparatus such as the computer 1000 via a USB connection. The printing unit 2070 prints digital data in the memory 2042 on a physical sheet in accordance with an instruction from the control unit 2040. As a printing method, an ink system, a toner system, or other systems can be employed.

Figure 4:
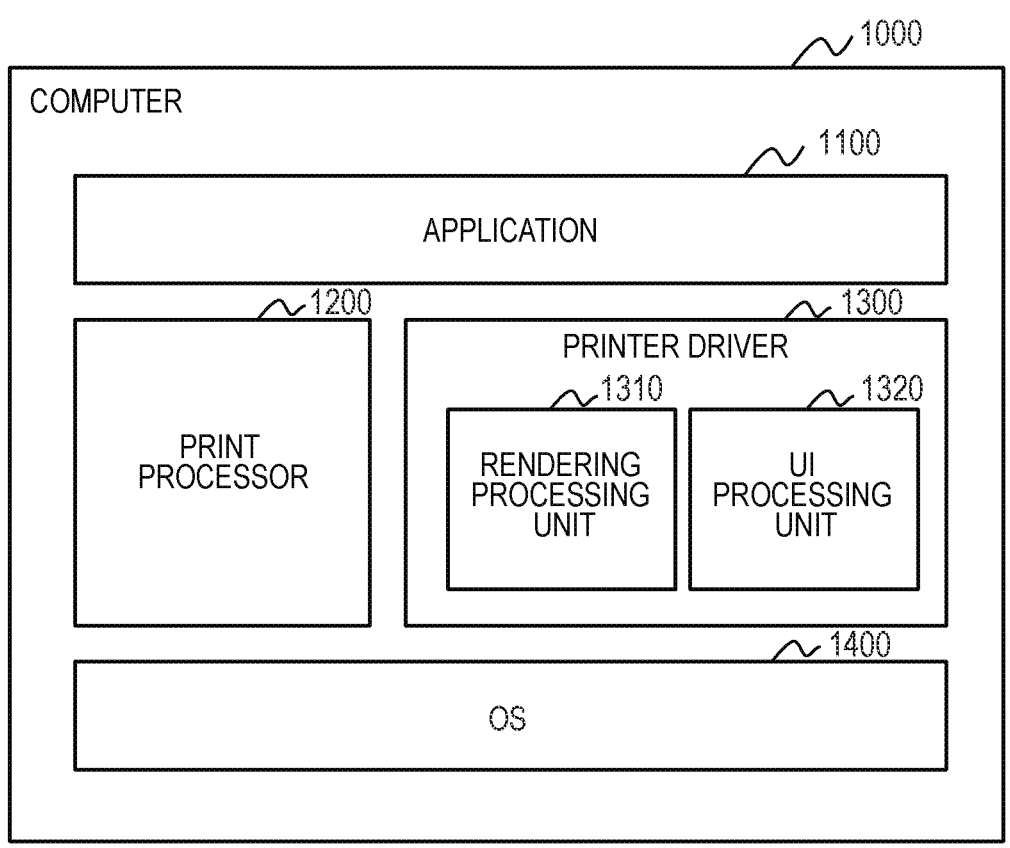
FIG. 4 is a diagram illustrating a software configuration example of a computer related to a print process.

FIG. 4 is a block diagram illustrating a configuration example of software related to a print process of the computer 1000. The computer 1000 has an application 1100, a print processor 1200, a printer driver 1300, and OS 1400.

The application 1100 is referred to as software such as document preparation software or spreadsheet software and has a printing function. When a user executes a printing function provided by the application 1100, it is possible to cause the printer 2000 to print information or the like currently displayed on the display unit 1010 of the computer 1000. The print processor 1200 is a module to process a print job issued by the application 1100 and can perform layout change or additional rendering such as a stamp at printing.

The printer driver 1300 displays a print setting available by using the printer 2000 (duplex, staple, or the like) on the UI and generates rendering data (page description language (PDL)) that is interpretable by the printer 2000 at printing. The printer driver 1300 has a rendering processing unit 1310 and a UI processing unit 1320. The rendering processing unit 1310 generates rendering data (PDL). The UI processing unit 1320 performs UI display in displaying or changing a print setting.

Each of the print processor 1200 and the printer driver 1300 is an independent module. The print processor 1200 can be installed at the same time as the printer driver 1300 is installed. However, since the print processor 1200 and the printer driver 1300 are independent of each other, the user can change a print processor to another print processor 1200 after the printer driver 1300 is installed.

The OS 1400 is an abbreviation of operating system and is software that manages a basic operation of the computer 1000. All of the application 1100, the print processor 1200, and the printer driver 1300 are managed by the OS 1400 and can be used when installed in the OS 1400.

Figure 5:
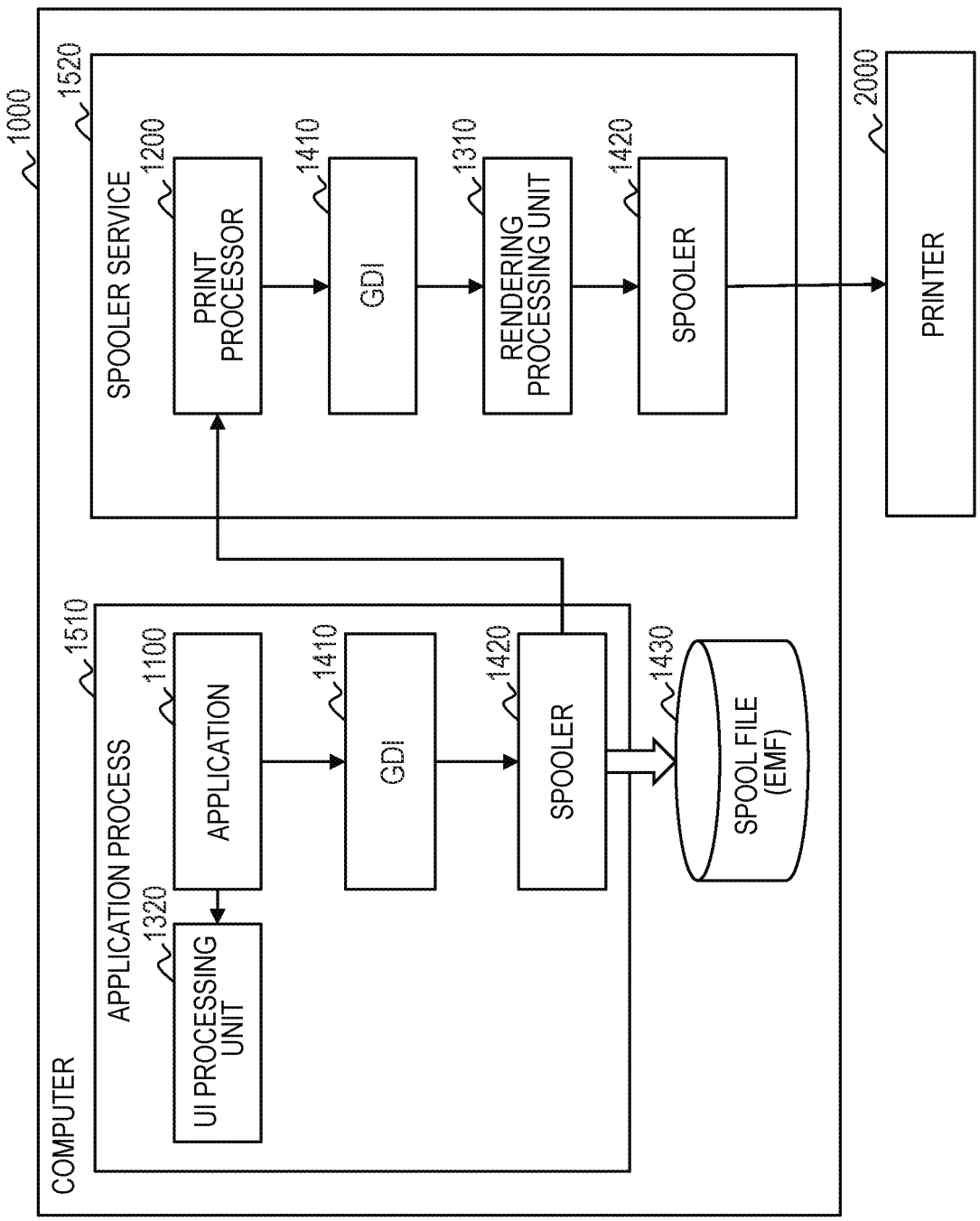
FIG. 5 is a diagram illustrating a flow of the print process.

FIG. 5 is a diagram illustrating a flow of a print process of the computer 1000. The computer 1000 has a GDI 1410, a spooler 1420, and a spool file (EMF) 1430 in addition to the application 1100, the print processor 1200, the rendering processing unit 1310, and the UI processing unit 1320.

The GDI 1410 and the spooler 1420 are components related to printing inside the OS 1400 of FIG. 4. The GDI 1410 provides an interface related to rendering such as displaying on a display or printing to the application 1100. The spooler 1420 creates the spool file (EMF) 1430 or performs a process related to transmission of print data to the printer 2000. The term "EMF" is an abbreviation of enhanced metafile and is an image file format created and used by the OS 1400 taking a use in the printer driver 1300 into consideration.

First, a process performed in an application process 1510 will be described. The application 1100 calls the UI processing unit 1320 of the printer driver 1300 if necessary and creates a print setting. Then, the application 1100 calls an API of the GDI 1410 and thereby passes the print setting or rendering data to the GDI 1410. The GDI 1410 stores the print setting or the rendering data passed from the application 1100 in the spool file (EMF) 1430 format via the spooler 1420. All of the processes so far are performed in the application process 1510.

Next, a process performed in a spooler service 1520 will be described. The print processor 1200 is loaded into the spooler service 1520, which is separate from the application process 1510. When a print process from the application 1100 ends, the print processor 1200 calls an API of the GDI 1410 by using the content described in the spool file (EMF) 1430 and thereby issues a rendering instruction to the GDI 1410. At this time, the print processor 1200 also performs the designated layout process, addition of a stamp rendering, or the like. The GDI 1410 replaces the API called from the print processor 1200 with an API for the rendering processing unit 1310 of the printer driver 1300 and calls the rendering processing unit 1310. The rendering processing unit 1310 converts the rendering instruction provided from the print processor 1200 described above into print data (PDL) in a format that is interpretable by the target printer 2000. The rendering processing unit 1310 passes the converted print data to the spooler 1420. The spooler 1420 transmits the print data passed from the rendering processing unit 1310 to the printer 2000 and causes the printer 2000 to perform a print process. The printer 2000 images the PDL received in the above operation and prints the imaged PDL on a physical sheet.

Figure 6:
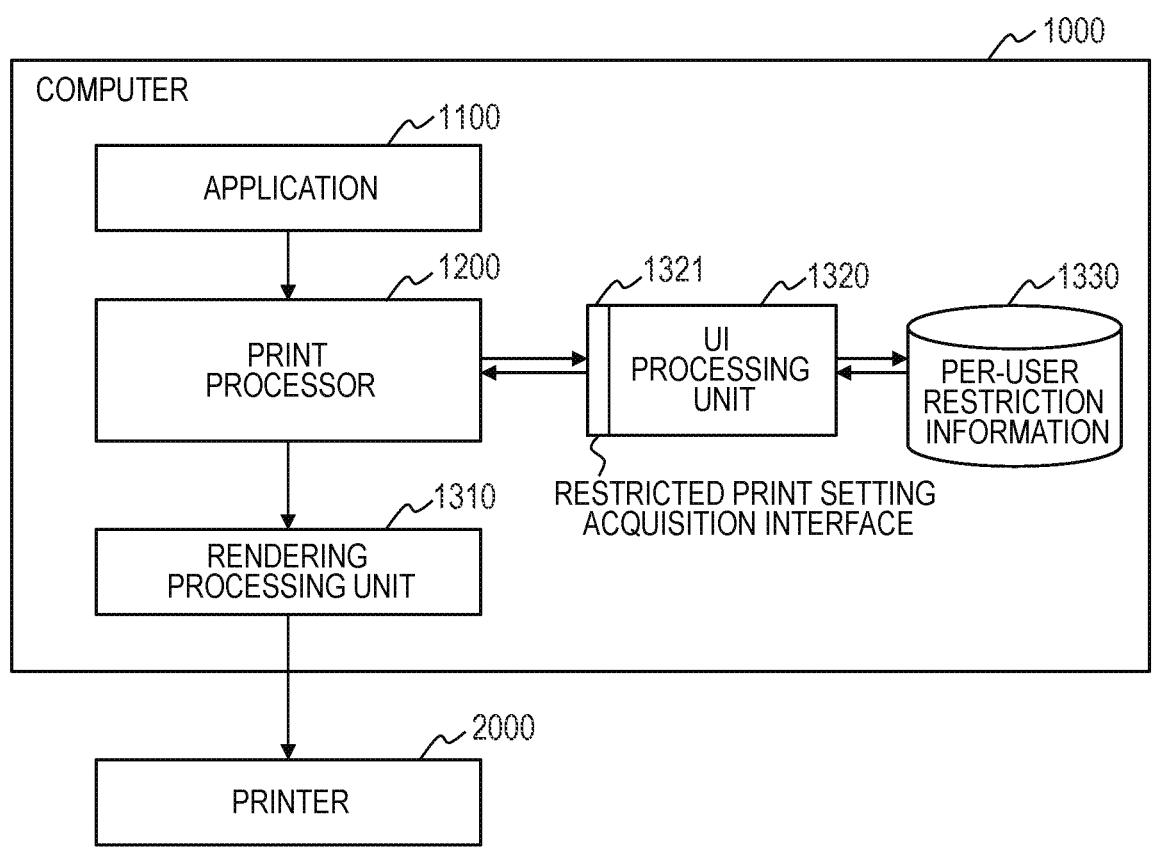
FIG. 6 is a block diagram illustrating a print processing flow.

FIG. 6 is a block diagram illustrating a print process flow of the computer 1000. While a flow of the overall print process is the same as the content illustrated in FIG. 5, the description of components (the GDI 1410 and the spooler 1420) inside the OS 1400 is omitted in FIG. 6 for simplification.

The printer driver 1300 is featured in applying a printing restriction for each user who performs printing. As a specific example, the printer driver 1300 performs a process that enables user A to designate all of the print settings but does not permit user B to perform simplex printing and forces user B to always perform duplex printing. Moreover, the printer driver 1300 forces user C to always arrange two or more logical pages on one side of a single physical sheet. As described above, arranging N pages of logical pages on one side of a single physical sheet is referred to as "N in 1". To perform an N in 1 process, the computer 1000 needs to reduce rendering contents of respective pages and arrange respective reduced pages in accordance with a setting of arrangement order. In the computer 1000, these layout processes are performed by the print processor 1200. When the print processor 1200 instead of the printer driver 1300 performs a layout process, there is an advantage that a single print processor 1200 can provide a layout process common to the plurality of printer drivers 1300.

All the print restriction information on user A to user C described above is stored in the storage unit 1030 as per-user restriction information 1330. The per-user restriction information 1330 is able to be edited by only the administrator and is unable to be edited by other users.

The description of a setting method performed by the administrator is omitted here because an existing method can be used. The per-user restriction information 1330 is managed by the UI processing unit 1320, and the UI processing unit 1320 can reference the per-user restriction information 1330 if necessary. Moreover, the UI processing unit 1320 has a "restricted print setting acquisition interface 1321" for externally acquiring a print setting to which print restriction information is reflected. The print processor 1200 calls the restricted print setting acquisition interface 1321 to acquire a print setting and perform a layout process in accordance with the content of the print setting. Therefore, by calling an API of the GDI 1410 with the layout process being performed, the print processor 1200 causes the rendering processing unit 1310 to create a PDL to which print restriction information is reflected.

Figure 7:
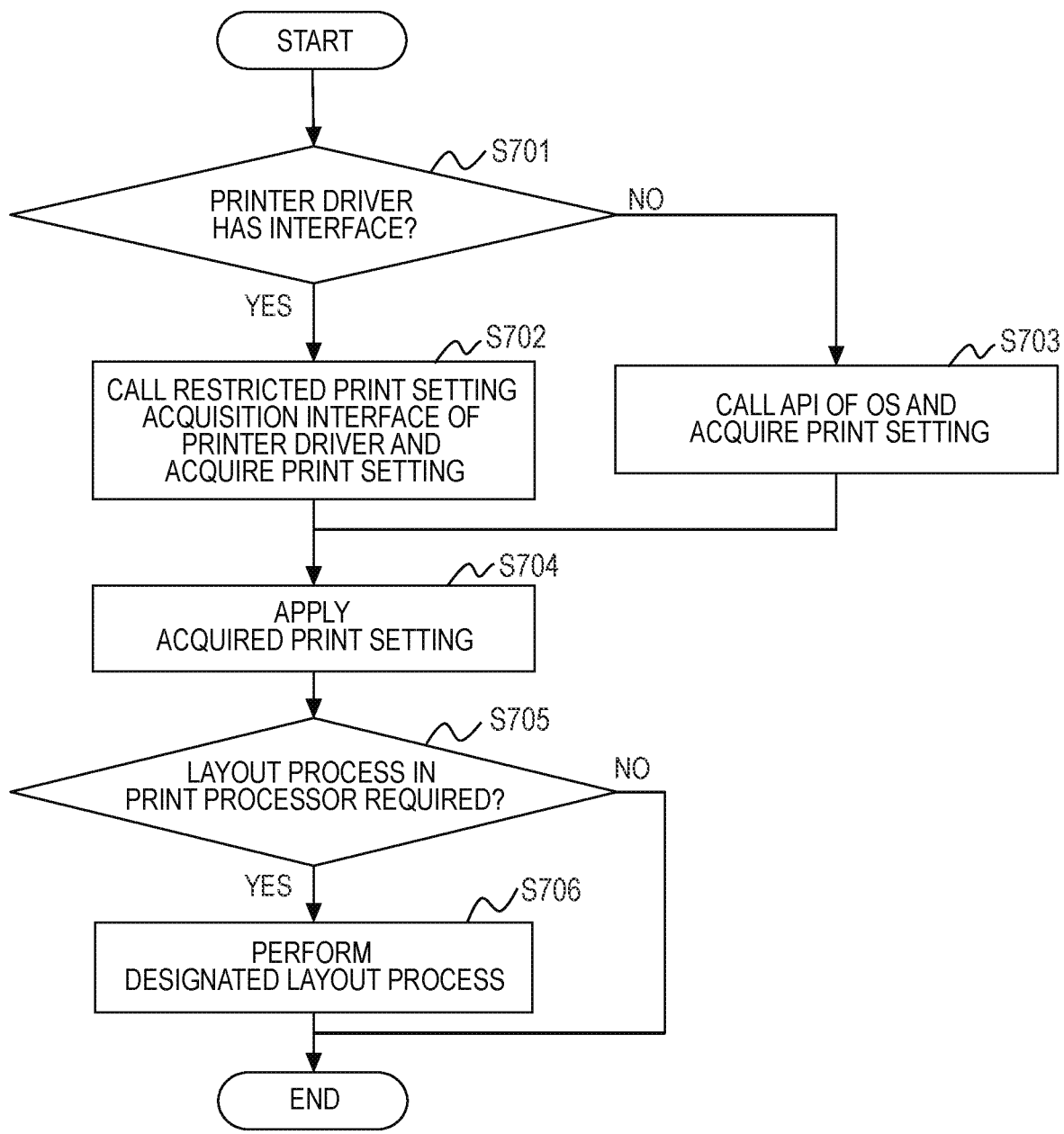
FIG. 7 is a flowchart illustrating a process performed by a print processor.

FIG. 7 is a flowchart illustrating a processing method of the print processor 1200 of the computer 1000 in more detail. The process of the flowchart will be described as a process performed by the print processor 1200 but is implemented when the CPU 1041 loads the print processor 1200 stored in the storage unit 1030 into the memory 1042 and executes the print processor 1200.

In step S701, the print processor 1200 determines whether or not the restricted print setting acquisition interface 1321 provided by the UI processing unit 1320 of the printer driver 1300 is present. If the restricted print setting acquisition interface 1321 is present, the print processor 1200 proceeds to step S702, and if the restricted print setting acquisition interface 1321 is not present, the print processor 1200 proceeds to step S703.

In step S702, the print processor 1200 calls the restricted print setting acquisition interface 1321 and acquires a user print setting. Specifically, the print processor 1200 transmits a print setting stored in the spool file (EMF) 1430 as an argument of the restricted print setting acquisition interface 1321 and acquires a user print setting returned therefrom. The process inside the restricted print setting acquisition interface 1321 will be described later with reference to FIG. 8. The process then proceeds to step S704.

In step S703, the print processor 1200 functions as an acquisition unit, calls an API of the OS 1400, acquires the user print setting, and proceeds to step S704.

In step S704, the print processor 1200 applies the user print setting acquired in step S702 or S703 as a print setting used in this print process.

Next, in step S705, the print processor 1200 confirms the content of the applied print setting and determines whether or not a layout process in the print processor 1200 is required. If a layout process is required, the print processor 1200 proceeds to step S706, and if a layout process is not required, the process of the flowchart of FIG. 7 ends.

In step S706, the print processor 1200 functions as an edition unit and performs edition such as a layout process designated in the print setting on the print data based on the applied print setting. Herein, while only the layout process is described as a process performed by the print processor 1200 for simplification, the print processor 1200 also performs an enlargement/reduction process, an addition process of a stamp rendering, or the like in the actual implementation. For example, the print processor 1200 performs a layout process, an enlargement process, a reduction process, or an addition process of a stamp rendering on print data.

As described above, the print processor 1200 can instruct the printer 2000 to process printing in accordance with the latest restriction information by acquiring, from the printer driver 1300, a print setting to which restriction information is reflected, and using the acquired print setting at the beginning of the process.

Figure 8:
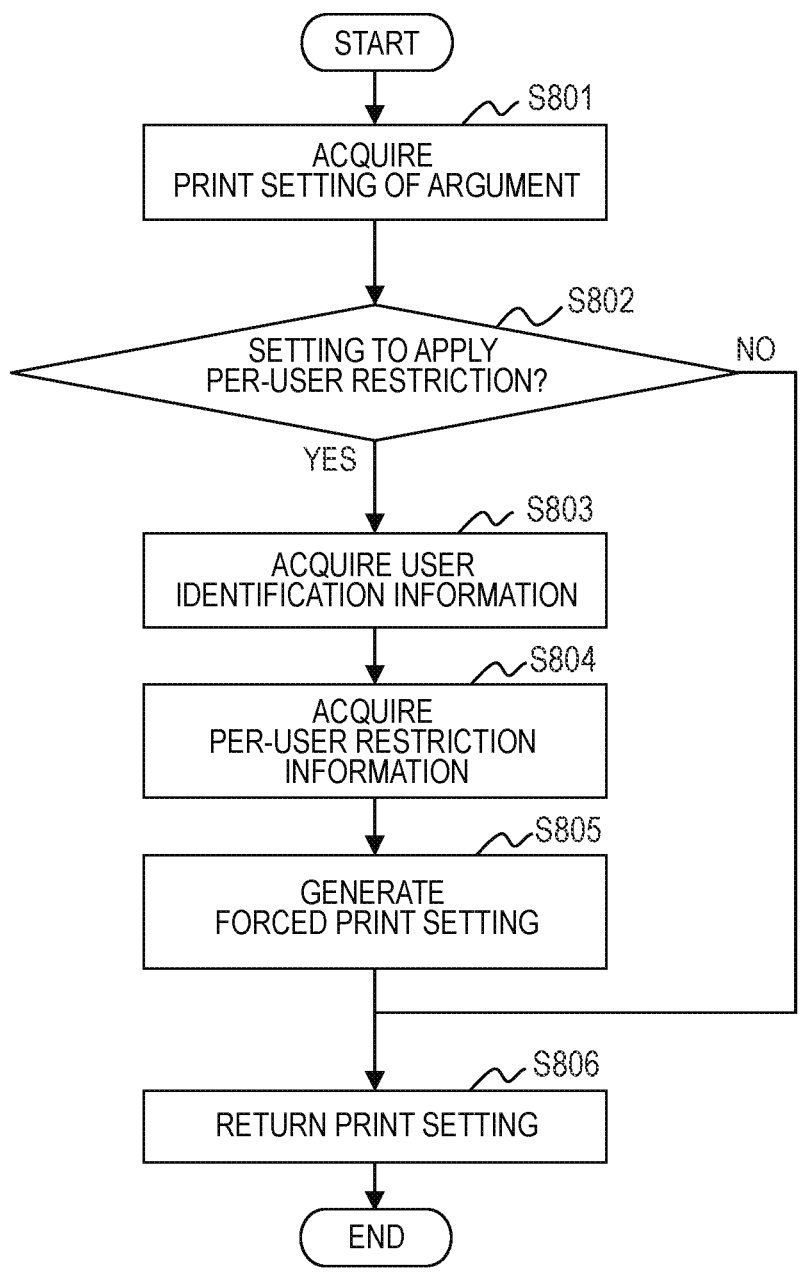
FIG. 8 is a flowchart illustrating a process performed by a UI processing unit.

FIG. 8 is a flowchart illustrating an internal process of the restricted print setting acquisition interface 1321 provided by the UI processing unit 1320 in step S702 of FIG. 7. The process of the flowchart is illustrated as a process performed by the UI processing unit 1320 but is implemented when the CPU 1041 loads the UI processing unit 1320 stored in the storage unit 1030 into the memory 1042 and executes the UI processing unit 1320.

In step S801, the UI processing unit 1320 functions as an acquisition unit and acquires the user print setting passed from the print processor 1200 as an argument of the restricted print setting acquisition interface 1321. The user print setting is a print setting issued by the application 1100, which is a print setting stored in the spool file (EMF) 1430.

Next, in step S802, the UI processing unit 1320 determines whether or not the print setting is set to apply a per-user restriction. The setting is a setting that the printer driver 1300 holds separately from the print setting and is set by an administrator in advance by using a UI (not illustrated) displayed by the UI processing unit 1320. If the print setting is set to apply a per-user restriction, the UI processing unit 1320 proceeds to step S803, and if the print setting is not set to apply a per-user restriction, the UI processing unit 1320 proceeds to step S806.

In step S806, the UI processing unit 1320 returns the print setting to a calling source directly, and the process of the flowchart of FIG. 8 ends.

In step S803, the UI processing unit 1320 functions as an acquisition unit and acquires, from the OS 1400, user identification information on the user who provides the current print instruction. The user is managed by the OS 1400 in advance, and the OS 1400 can identify identification information on the current user by causing the user to input authentication information such as a user name and a password at a login operation to the computer 1000.

Next, in step S804, the UI processing unit 1320 acquires the per-user restriction information 1330 stored in the storage unit 1030. The per-user restriction information 1330 is per-user print restriction information.

Next, in step S805, the UI processing unit 1320 functions as a change unit and changes the user print setting acquired in step S801 based on the user identification information acquired in step S803 and the per-user restriction information 1330 acquired in step S804. For example, when restriction information for the user is to enforce duplex printing, the UI processing unit 1320 changes the print setting to duplex printing. Further, for example, when the user restriction information is to enforce N in 1 printing in which N is larger than or equal to two, the UI processing unit 1320 changes the print setting to 2 in 1 printing. For example, the UI processing unit 1320 changes the user print setting to duplex printing or N in 1 printing. Note that, if the print setting acquired in step S801 is already 4 in 1 printing or the like that meets restriction information, the UI processing unit 1320 does not change the N in 1 setting. The process then proceeds to step S806.

In step S806, the UI processing unit 1320 returns the print setting changed in step S805 to the calling source, and the process of the flowchart of FIG. 8 ends.

By performing the above processes, the computer 1000 can cause the print processor 1200 to perform a process by using a print setting to which per-user restriction information is reflected in real time. Note that, as a print setting causing the print processor 1200 to perform a process, a layout process is mainly illustrated as an example, however, the embodiment can be implemented in the same manner also for other processes such as stamp addition or header/footer addition. Moreover, although the printer driver 1300 and the print processor 1200 installed in the computer 1000 are illustrated as an example, the embodiment can be implemented in the same manner also in a shared printer environment that is a mechanism provided by the OS 1400. While the application process 1510 is executed on a client, and the spooler service 1520 is executed on a server in server-side rendering of a shared printer, the process of the present embodiment can be applied in the same manner.

Second Embodiment

Although the example implemented with a printing system including one computer 1000 and one printer 2000 has been described in the first embodiment, an example implemented with a printing system in which the per-user restriction information is further managed in a server will be described in the second embodiment. The printing system can manage the per-user restriction information in a uniform manner even in an environment including a plurality of computers by managing the per-user restriction information in the server. In the second embodiment, the same configuration and process as those in the first embodiment will be omitted, and different features will be described.

Figure 9:
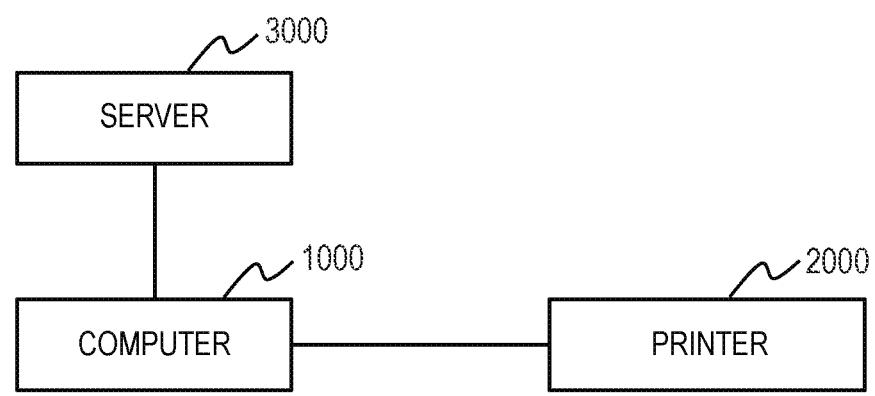
FIG. 9 is a diagram illustrating a configuration example of a printing system.

FIG. 9 is a block diagram illustrating a configuration example of a printing system according to the second embodiment. The printing system has the computer 1000, the printer 2000, and a server 3000. The computer 1000 and the server 3000 are connected to each other via a network or the like and can communicate with each other. The server 3000 is another different information processing apparatus from the computer 1000. Note that a plurality of computers or a plurality of printers may be present in the printing system. Since the internal configuration of the server 3000 is the same as the internal configuration of the computer 1000 illustrated in FIG. 2, the description thereof will be omitted.

Figure 10:
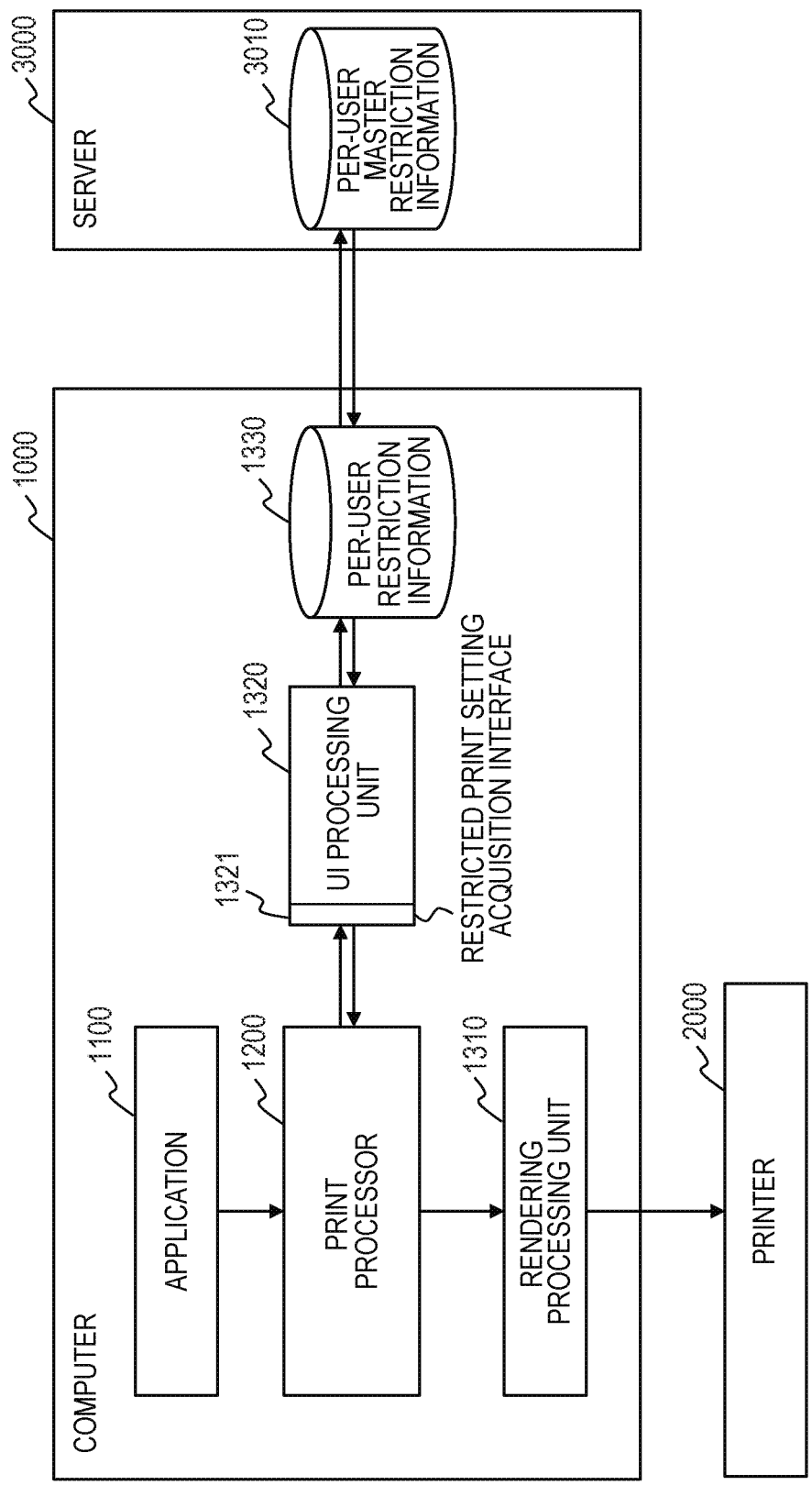
FIG. 10 is a block diagram illustrating a print processing flow.

FIG. 10 is a diagram illustrating a flow of a print process of the printing system. While the internal flow of the computer 1000 is substantially the same as that described with FIG. 6, in the second embodiment, per-user master restriction information 3010 that is a source of the per-user restriction information 1330 is present inside the server 3000. The per-user master restriction information 3010 is per-user master print restriction information. This enables the printing system to reflect the per-user restriction information 1330 also when the user causes a different computer (not illustrated) from the computer 1000 to perform printing. The administrator can edit the per-user master restriction information 3010 on the server 3000. The per-user restriction information 1330 inside the computer 1000 is synchronized with the per-user master restriction information 3010. The per-user restriction information 1330 inside the computer 1000 is unable to be individually edited even by the administrator.

Figure 11:
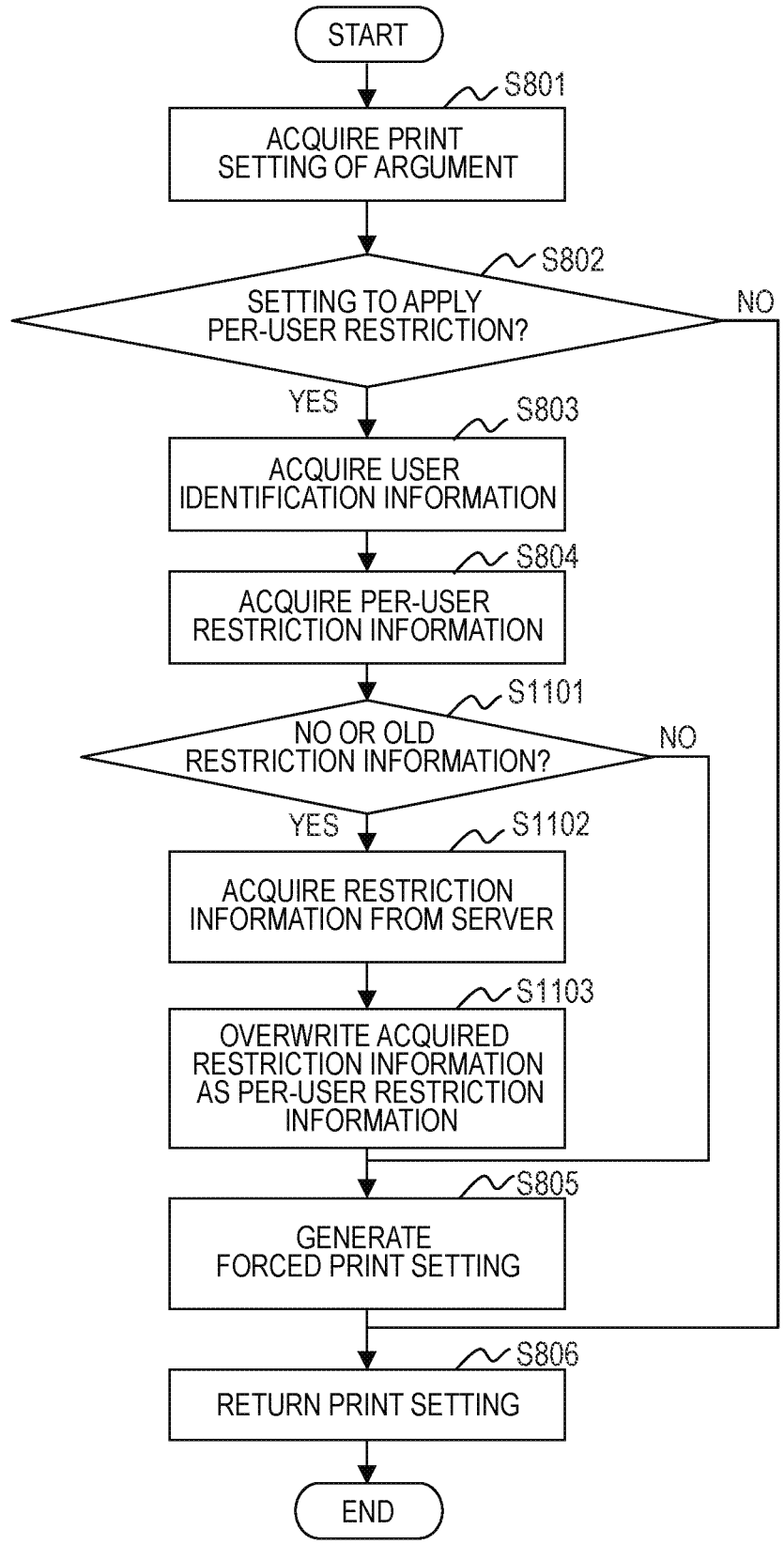
FIG. 11 is a flowchart illustrating a process performed by the UI processing unit.

FIG. 11 is a flowchart illustrating an internal process of the restricted print setting acquisition interface 1321 provided by the UI processing unit 1320. The process of this flowchart will be described as a process performed by the UI processing unit 1320 but is implemented when the CPU 1041 loads the UI processing unit 1320 stored in the storage unit 1030 into the memory 1042 and executes the UI processing unit 1320. The flowchart of FIG. 11 is a flowchart in which steps S1101 to S1103 are added to the flowchart of FIG. 8.

Since steps S801 to S806 are the same as steps S801 to S806 described with FIG. 8, the description thereof will be omitted. The UI processing unit 1320 performs the process of steps S801 to S804 and then proceeds to step S1101.

In step S1101, the UI processing unit 1320 determines whether or not the per-user restriction information 1330 is not acquired in step S804 or whether or not the per-user restriction information 1330 is older than the per-user master restriction information 3010. If the per-user restriction information 1330 is not stored in the storage unit 1030 or the per-user restriction information 1330 stored in the storage unit 1030 is older than the per-user master restriction information 3010, the UI processing unit 1320 proceeds to step S1102. The per-user master restriction information 3010 is stored in the server 3000. Further, if the per-user restriction information 1330 is stored in the storage unit 1030 and the per-user restriction information 1330 stored in the storage unit 1030 is not older than the per-user master restriction information 3010, the UI processing unit 1320 proceeds to step S805.

In step S1102, the UI processing unit 1320 acquires the per-user master restriction information 3010 from the server 3000.

Next, in step S1103, the UI processing unit 1320 overwrites the per-user master restriction information 3010 acquired in step S1102 as the per-user restriction information 1330. The UI processing unit 1320 then proceeds to step S805 and performs a process by using the overwritten per-user restriction information 1330.

According to the second embodiment, even when the per-user restriction information 1330 inside the computer 1000 is old at printing, the computer 1000 can acquire the latest per-user master restriction information 3010 from the server 3000 and reflect the acquired latest per-user master restriction information 3010 to the print setting.

According to the first and second embodiments, even when the per-user restriction information 1330 has changed between the time a print setting window is displayed and the time printing is performed, the computer 1000 can change the print setting based on the latest per-user restriction information 1330.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that its scope is not limited to the disclosed exemplary embodiments. The scope of the following claims is to be accorded the broadest interpretation so as to encompass all such modifications and equivalent structures and functions.

This application claims the benefit of Japanese Patent Application No. 2020-088055, filed May 20, 2020, which is hereby incorporated by reference herein in its entirety.

What is claimed is:

1. An information processing method performed by a computer which is able to communicate with a printing apparatus, the information processing method comprising:
acquiring, by a print processor, a print setting;

acquiring, by a printer driver, per-user restriction information for a user logged in the computer;

changing, by the printer driver, the print setting based on the acquired per-user restriction information; and editing, by the print processor, print data based on the changed print setting wherein when no per-user restriction information is stored in an information processing apparatus which performs the information processing method, or the per-user restriction information stored in the information processing apparatus is older than the per-user restriction information stored in another information processing apparatus that is different from the information processing apparatus, the print setting is changed based on per-user restriction information stored in the another information processing apparatus, and when per-user restriction information is stored in the information processing apparatus, and the per-user restriction information stored in the information processing apparatus is not older than the per-user restriction information stored in another information processing apparatus that is different from the information processing apparatus, the print setting is changed based on the per-user restriction information stored in the information processing apparatus.

2. The information processing method according to claim 1, wherein the print setting is changed to duplex printing or N in 1 printing.

3. The information processing method according to claim 1, wherein a layout process, an enlargement process, a reduction process, or an addition process of a stamp rendering on the print data is performed based on the changed print setting.

4. The information processing method according to claim 1, further comprising acquiring, by the printer driver, user identification information on the user, wherein the print setting is changed based on the acquired user identification information and the acquired per-user restriction information.

5. An information processing apparatus which is able to communicate with a printing apparatus, comprising:

a processor that causes the information processing apparatus to:

acquire, by a print processor, a print setting;

acquire, by a printer driver, per-user restriction information for a user logged in the computer;

change, by the printer driver, the print setting based on the acquired per-user restriction information; and edit, by the print processor, print data based on the changed print setting, wherein when no per-user restriction information is stored in the information processing apparatus, or the per-user restriction information stored in the information processing apparatus is older than the per-user restriction information stored in another information processing apparatus that is different from the information processing apparatus, the print setting is changed based on per-user restriction information stored in the another information processing apparatus, and when per-user restriction information is stored in the information processing apparatus, and the per-user restriction information stored in the information processing apparatus is not older than the per-user restriction information stored in another information processing apparatus that is different from the information processing apparatus, the print setting is changed based on the per-user restriction information stored in the information processing apparatus.

6. A non-transitory storage medium storing a program for an information processing method performed by a computer which is able to communicate with a printing apparatus, the information processing method comprising:

acquiring, by a print processor, a print setting;

acquiring, by a printer driver, per-user restriction information for a user logged in the computer;

changing, by the printer driver, the print setting based on the acquired per-user restriction information; and editing, by the print processor, print data based on the changed print setting wherein when no per-user restriction information is stored in an information processing apparatus which performs the information processing method, or the per-user restriction information stored in the information processing apparatus is older than the per-user restriction information stored in another information processing apparatus that is different from the information processing apparatus, the print setting is changed based on per-user restriction information stored in the another information processing apparatus, and when per-user restriction information is stored in the information processing apparatus, and the per-user restriction information stored in the information processing apparatus is not older than the per-user restriction information stored in another information processing apparatus that is different from the information processing apparatus, the print setting is changed based on the per-user restriction information stored in the information processing apparatus.

7. The non-transitory storage medium according to claim 6, wherein the print setting is changed to duplex printing or N in 1 printing.

8. The non-transitory storage medium according to claim 6, wherein a layout process, an enlargement process, a reduction process, or an addition process of a stamp rendering on the print data is performed based on the changed print setting.

9. The non-transitory storage medium according to claim 6, wherein information processing method further comprises acquiring, by the printer driver, user identification information on the user, wherein the print setting is changed based on the acquired user identification information and the acquired per-user restriction information.

* * * * *